Oct. 26, 1954  J. E. GLEASON ET AL  2,692,537
ENDLESS CHAIN CUTTER AND MACHINE EMPLOYING THE SAME
FOR PRODUCING SPIRAL BEVEL GEARS AND THE LIKE
Filed July 29, 1950  4 Sheets-Sheet 3

INVENTORS
JAMES E. GLEASON
OLIVER F. BAUER
BY
Richard W. Treverton
ATTORNEY

Patented Oct. 26, 1954

2,692,537

UNITED STATES PATENT OFFICE 2,692,537

ENDLESS CHAIN CUTTER AND MACHINE EMPLOYING THE SAME FOR PRODUCING SPIRAL BEVEL GEARS AND THE LIKE

James E. Gleason, Rochester, and Oliver F. Bauer, East Rochester, N. Y., assignors to The Gleason Works, Rochester, N. Y., a corporation of New York Application July 29, 1950, Serial No. 176,572

26 Claims. (Cl. 90—5)

The present invention relates to an improved gear cutting machine, and to an improved cutter adapted for use with such a machine, the cutter having blades which turn as a unit with a rotating cutter core during the cutting operation but at other times travel a different path.

The primary objective of the invention is to provide, in a rotary cutter of given diameter, a greater number of cutting blades than has heretofore been practicable, to thereby enable more rapid and hence lower cost cutting; and also to increase cutter life, to thereby decrease cutter expense. According to the invention a number of blade carrying elements, greater than can be accommodated at one time upon the rotating cutter core, are arranged to travel in a train to and from the core in order that each of them may rotate as a unit with the core while cutting. To this end suitable guide means for the elements are provided in a housing which extends around the core; preferably the elements are linked together to form an endless chain which runs over the core and the guide means.

While seated upon the core each element is secured thereto by pressure means which conveniently take the form of rollers backed by a pressure exerting device. The seating surfaces of the core and the elements are so arranged that the pressure means act to wedge them firmly together, whereby during the cutting operation the blades act substantially as though they were integral with the core. The rollers of the pressure means preferably are arranged to move in a circuit during a part of which they roll between the blade carrying elements and a plate carried by the pressure exerting device. By this arrangement the moving elements are successively secured to and released from the core by continuous action of the rollers, which themselves may be connected to form an endless chain.

In order to counteract certain undesired effects of the pressure means, namely those of increasing the loads on the core spindle bearings and of slightly flexing the spindle, the invention provides counter-pressure means which act on the core in a direction substantially diametrically opposed to the pressure means. The counter-pressure means may comprise a pair of rollers backed by a suitable pressure applying device and arranged to roll on a surface portion of the core diametrically opposite to that on which the blade carrying elements are seated.

It is important to accurate cutting that chips and other foreign matter be kept away from the interfitting surfaces of the blade carrying elements and the cutter core. To this end the core and the elements are completely encased in a housing whose cover has a slot through which at least the cutting portions of the blades project. The blade carrying elements are so formed that they cooperate with the inner surface of the cover adjacent this slot to provide a continuous seal for preventing foreign matter from passing through the slot into the housing interior. Preferably the blades are made as separate units from the carrying elements, and are detachably secured thereto by fastening means that are accessible from the exterior of the housing, so that blades can be replaced without opening the housing.

In order to effect accurate registration of the cutter carrying elements with the rotating cutter core, the means carried by the housing for guiding the train of elements include guide rails slidably interfitting with the elements. The surfaces of the elements which seat on the core are separate from their surfaces which engage these guide rails in order that wear of the latter surfaces will have no effect upon accurate seating of the elements on the core.

The foregoing and other objects and advantages of the invention will appear from the following description of the machine and cutter shown in the accompanying drawings, wherein.

Figure 1:
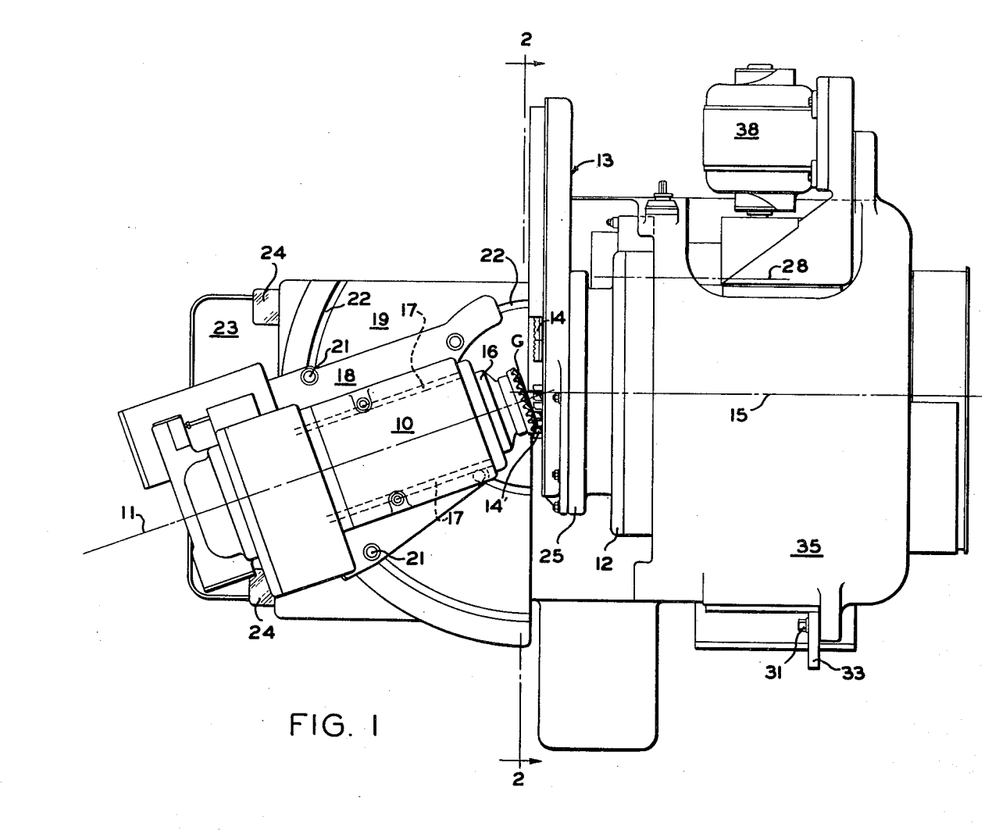
Figure 1 is a plan view of the machine.

As shown in Figure 1 the machine, which in this case is one designed to cut non-generated spiral bevel or hypoid gears, has a work head 10 for supporting a gear blank G for indexing movement about a horizontal axis 11, and a cutter spindle housing 12 supporting a cutter unit 13, the latter having blades 14 which while acting on the blank rotate about cutter axis 15. The blank is mounted by suitable chucking equipment on a work spindle 16 that is rotatable within the head 10 in order that the blank may be indexed to the successive positions in which its several tooth spaces are cut.

The head 10 is mounted on ways 17 on a swinging base 18 in order that the blank may be adjusted axially into working relation to the cutter, and also in order that it may be withdrawn and advanced for chucking and dechucking operations. Swinging base 18 is adjustable about a vertical axis upon a sliding base 19, bolts 21 anchored in concentric arcuate T-slots 22 in the sliding base providing for this adjustment which enables the blank G to be set to the proper pitch angle. The sliding base 19 in turn is adjustable upon the base of the machine, designated 23, along ways 24 which extend parallel to the cutter axis 15. Movement of the sliding base along these ways enables the work spindle to be adjusted to compensate for change in the height (along axis 15) of the cutter blades, as for example after the blades have been resharpened.

Figures 2, 11:
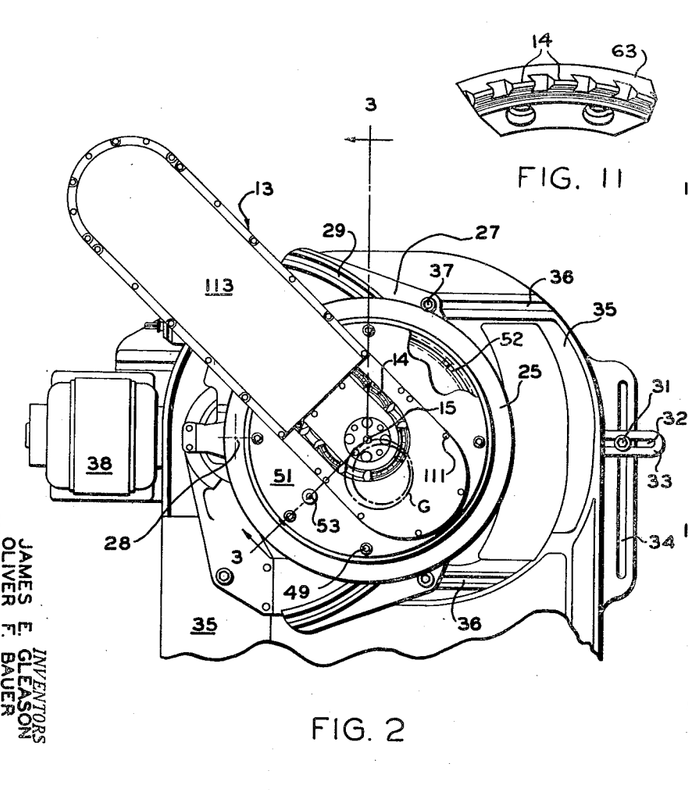
Figure 2 is a fragmentary elevation of the cutter supporting part of the machine, viewed in the plane indicated by line 2—2 in Figure 1.
Figure 11 is a face view of a cutter blade segment.

The cutter unit 13 is mounted on a flange 25 of the cutter spindle housing 12 which is pivoted to a horizontal slide 27 for adjustment relative thereto about an axis 28 that is parallel to axis 15. The housing 12 may be secured in the position to which it is adjusted by bolts (not shown) anchored in an arcuate T-slot 29 formed in the face of slide 27 concentric with axis 28, and the housing may be further secured by a bolt 31 which is adjustable in a radial slot 32 in an arm 33 that extends from the housing 12. The bolt 31 is also adjustable, vertically, in a slot 34 in a stationary upright 35 which is extended from the machine base and substantially surrounds the cutter spindle housing. Due to the eccentric relation of axes 15 and 28 the adjustment of this spindle housing 12 about axis 28 is effective to change the vertical position of the cutter. Extending horizontally along the front face of upright 35 are T-slots 36 which anchor bolts 37 that secure the slide 27 to the upright. Upon loosening of these bolts the slide may be shifted along the T-slots 36 to effect lateral adjustment of the cutter.

A motor 38 connected to the cutter-spindle housing 12 is operative through transmission means (not shown) to drive a shaft 39 (Figure 3) that is journalled in the housing 12. Shaft 39 carries a pinion 41 meshing with an internal ring gear 42 which is bolted to a flange 43 on the cutter spindle 44. The latter is journalled in the housing 12 on anti-friction bearings 45 and has secured to its nose, by screws 46, the rotating core 47 of the cutter unit 13.

Figure 3:
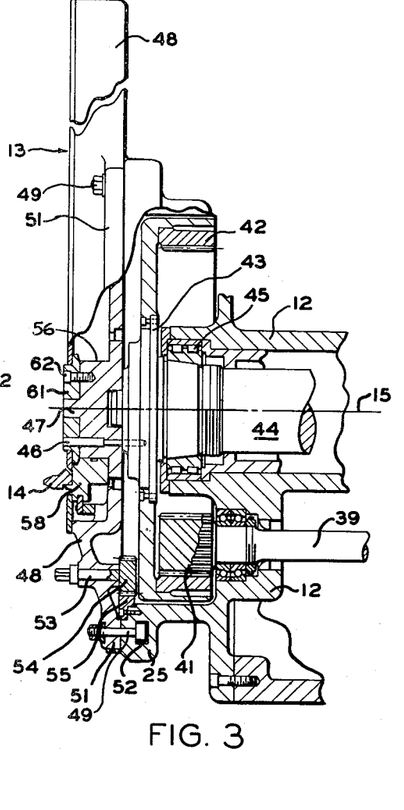
Figure 3 is a fragmentary sectional view taken in planes extending axially of the cutter core, approximately as indicated by line 3—3 in Figure 2.

The cutter unit includes a housing 48 having flanges 51 connected to the spindle housing flange 25 by bolts 49. The heads of these bolts are anchored in a circular T-slot 52 in flange 25 whereby when the bolts are loosened the unit 13 may be adjusted about the spindle axis 15. Such adjustment may be effected by turning a shaft 53 on which is a pinion 54 meshing with an internal ring gear 55 fixed within flange 25. The purpose of this adjustment, which will appear more fully as the description proceeds, is to so position the cutter assembly that the blades 14 that are in the cut in the work G at any instant will be those which are clamped to the rotating core of the cutter, for rotating as a unit with the latter about the axis 15.

Figure 5:
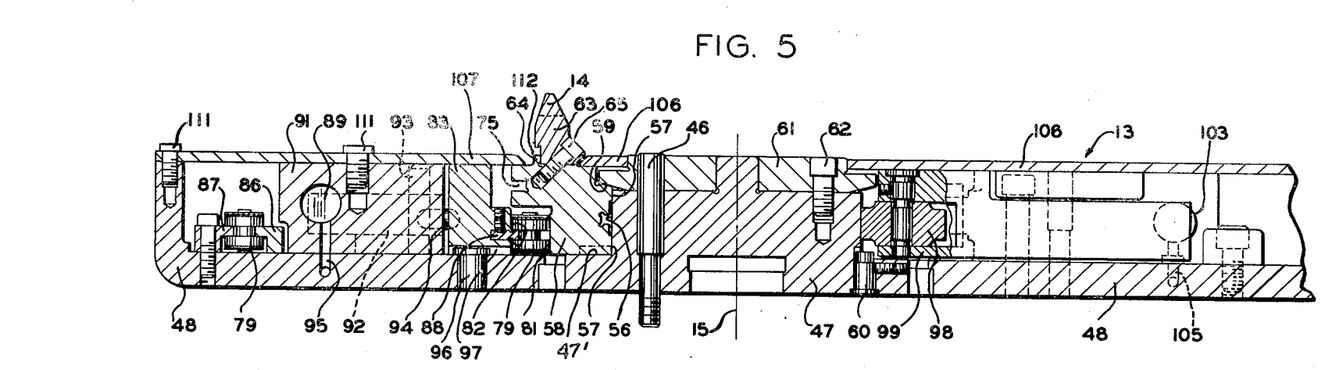

Adapted to seat on cylindrical surface 56 of the core 47 are spaced concave surfaces 57 of each of a large number of chain links 58 which carry the cutter blades 14. When surfaces 57 are seated upon cylindrical surface 56, the links preferably have been compressed by wedge action between the forward face 47' of the inner flange of the core and the rear face 59 of a circular plate 61 which is secured by bolts 62 to the core and thereby constitutes its forward flange. The blades 14 may be formed in multiple upon arcuate segments 63 which seat on the forward faces of the links 58, being positioned radially by shoulders 64 of the links. One of the arcuate segments that has five blades is shown in Fig. 11. As shown in Figure 5 each segment may be detachably secured against the forward face and the shoulder 64 of its link by an inclined screw 65.

Figures 4, 6, 8:
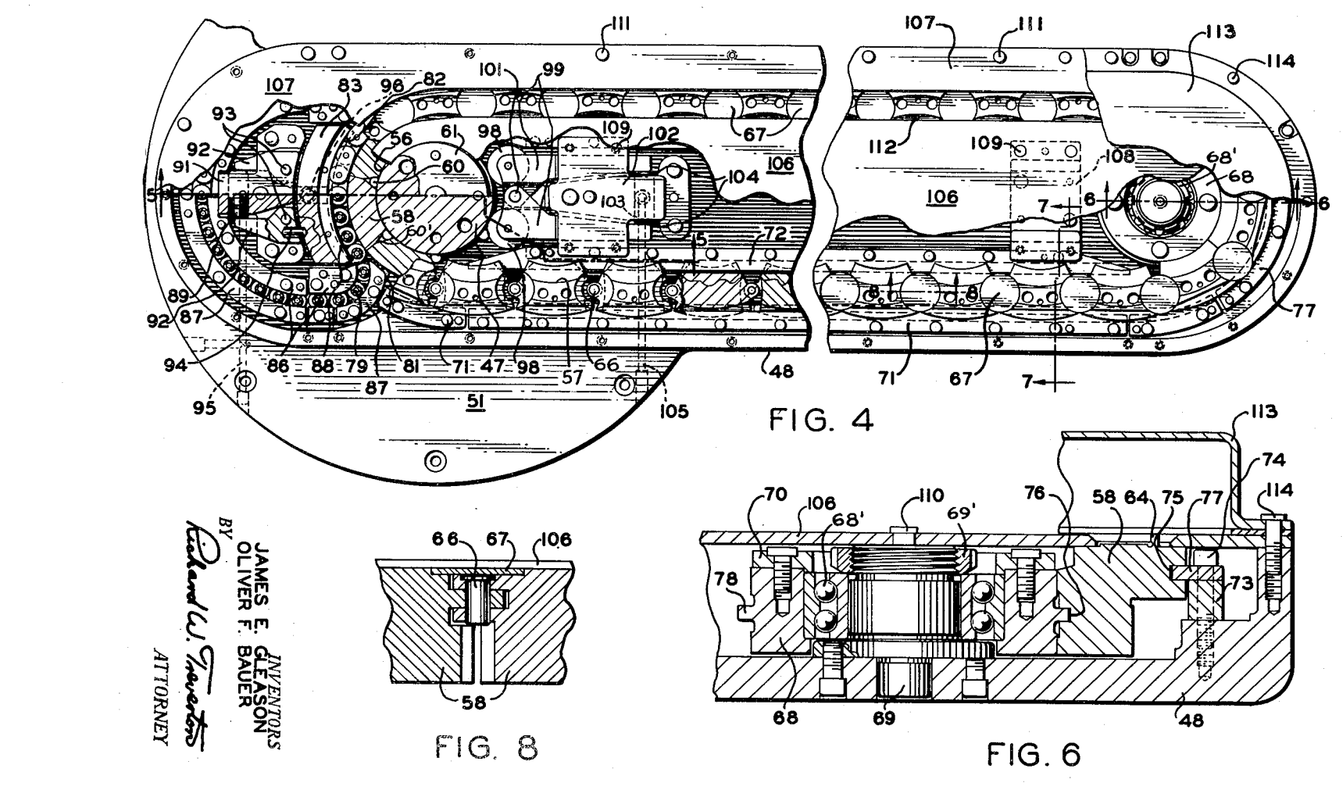
Figure 4 is a front elevation of the cutter with parts broken away to show the internal structure.
Figures 5, 6, and 7 are fragmentary sectional views taken in planes parallel to the cutter core axis approximately as indicated by lines 5—5, 6—6, and 7—7, respectively, of Fig. 4.
Figures 8 and 9 are detail views showing the connections of the links which make up the chain of cutter carrying elements and the chain of rollers, respectively.

As shown in Figure 8 the links 58 are pivotally connected by pins 66. The ends of the pins are covered by discs 67 which seat in recesses in the links so that their outer faces are substantially flush with the forward faces of the links. The discs are held in place by housing cover sections 106 and 107, described more fully hereinafter, which partially overlie the discs. The chain runs between the core 47 and an idler wheel 68 which is mounted on anti-friction bearing means 68' for rotation about a stud 69 that is secured to the housing 48. The idler and bearing assembly is held together by a nut 69' screwed to the stud and by a ring 70 secured to the idler. The diameter of the idler is preferably the same as that of surface 56 of the cutter core in order that the arcuate surfaces 57 of the links will seat fully upon it. Keys 60 secured to the core 47 are adapted to seat in recesses 60' between adjacent links 58 when the latter are running on the core, their purpose being to maintain the chain in timed relationship to the core.

Cooperating with the idler in guiding the chain and to assure proper alignment of the links when they pass onto the cutter core, guide rails 71 and 72 are extended along the housing between the core and idler, being separated from the base wall of the housing by spacers 73 and secured by fasteners 74. The rails 71 and 72 have sliding contact with grooves 75 and 76, respectively, formed in the outer and inner sides of the links. The links while running around the idler are guided by arcuate rails 77 which ride in the grooves 75, while an annular ridge 78 on the idler seats in the grooves 76 of the links that are running over the idler.

Figures 7, 9:
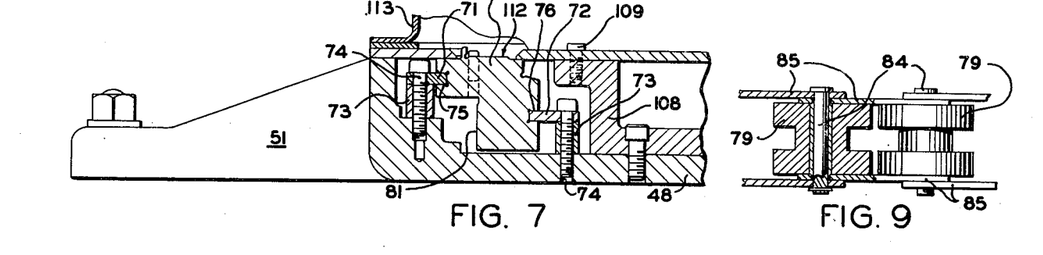

The pressure means for clamping the links to the cutter core, during the time they run on the core, include rolling members which in the present embodiment of the invention are in the form of rollers 79 arranged to roll between convex arcuate surfaces 81 of the links and concave surfaces 82 of a pressure block 83. As shown in Figure 4 the arcuate surfaces 82 and also the arcuate surfaces 81 (of those links 58 which are running over the core) are concentric with the core. As best shown in Figures 4 and 9 the rollers 79 may be connected by pins 84 and links 85 to form an endless chain guided by inner and outer rails 86 and 87 which engage in grooves in the rollers. While the rollers are running between the pressure block and the cutter carrying links they are guided by an arcuate track section 88 that is secured to the block 83.

The block is a part of a pressure applying device, for exerting pressure on rollers 79, which further comprises opposed pistons 89 slidable in a cylinder chamber that is formed in a bracket 91; a pair of levers 92 pivoted by pins 93 to the bracket 91; and compression links 94 seated in opposed recesses in the levers 92 and pressure block 83. When fluid pressure is applied through a passage 95 to a portion of the cylinder chamber between the two pistons 89, the latter are moved apart, thereby swinging the levers 92 about their respective pivot pins 93 and acting through the two links 94 to urge the block 83 to the right (in Figures 4 and 5). The block is in this way effective, through the rollers 79, to press links 58 firmly against the surface 56 of the cutter core. The pressure block is located by the seating of its arcuate surface 82 upon rollers 79 and by a stud 96 which is carried by housing 48 and is confined within a groove 97 in the pressure block.

For applying counter-pressure to the cutter core, to reduce the load on the cutter spindle bearings and to eliminate flexure of the cutter spindle caused by the pressure means 89, 92, 94, 83, 79, there are provided rollers 98 backed by similar pressure means. The latter means comprise a pair of levers 99 each of which carries one of the rollers 98 and both of which are pivoted by a pin 101 to a bracket 102 which is secured to the housing 48. The bracket contains a cylinder 103 containing opposed pistons 104 whose outer ends engage the levers. When pressure is applied to the middle of the cylinder via a fluid passage, designated 105, the pistons are moved apart, swinging the levers 99 about their pivot 101 and thereby applying through the rollers 98 a pressure upon the core in the opposite direction to the pressure applied to it through the rollers 79. It will be noted that the rollers 98 roll on a different portion of the core surface 56 than the portions engaged by links 58, so that unnecessary wear of the latter portions is obviated.

Extending over the front of the housing, to enclose all moving parts of the cutter except the blades 14 and the forward face of the plate 61 are inner and outer cover sections 106 and 107. Section 106 is secured to the housing proper by means of screws 109 which extend into brackets 108 and 102, and screw 110 extending into trunnion 69 while section 107 is secured in place by screws 111 extending into housing 48 and bracket 91. The adjacent edges of the sections 106 and 107 define an endless slot 112 of generally oval shape through which the cutter blades project. As will be apparent from Figure 5 the blade segments 63 may be removed and replaced without opening the cover since the screws 65 are accessible from the exterior of the housing. Similarly the heads of screws 46 are accessible from the housing exterior so that upon removal of fasteners 49 the whole cutter unit 13 may be removed from the machine without being opened.

The outer and inner edge portions of the sections 106 and 107, respectively are slidably engaged by the forward faces of the links 58, and (as shown in Figure 8) also by the outer faces of the discs 67, thereby providing a continuous seal around slot 112 for excluding chips and other foreign matter from the housing interior. To afford protection around the cutter blades not engaged with the work, a guard 113 is secured over the forward face of the cover by screws 114.

Prior to operating the machine the cutter and the blank are brought into the proper angular and axial positional relationship by making the machine adjustments heretofore referred to. The adjustments include positioning of the cutter housing about axis 15 so that the cutter blades in the cut in the work at any instant are those blades whose links 58 are clamped to core 47 by the pressure means including block 83 and rolling members 79.

In operation hydraulic fluid under suitable pressure is applied by pumping means (not shown) to the conduits 95 and 105 so that an approximately equal force is applied through rollers 79 and 98 to opposite sides of the core 47, the force applied through rollers 79 serving to press the links 58 that are on the core into firmly seated relation upon the core surface 56. The core is rotated with its spindle 44 by operation of motor 38, shaft 39 and gearing 41, 42, and during such rotation the blades 14 on the chain links are successively moved with cutting action through the gear blank G. While its blade (or blades) is cutting, each link rotates with the core in the same manner as though it were an integral part thereof. However, when the link leaves the cutting zone, i. e. when it runs off of the core, it passes from the influence of the pressure means, represented by the rollers 79, and hence it is free to follow the guide means including track rails 71, 72 and 77 and idler 68 until, in the next cycle of the operation, it again passes between and is squeezed between the rollers 79 and the core.

Figure 10:
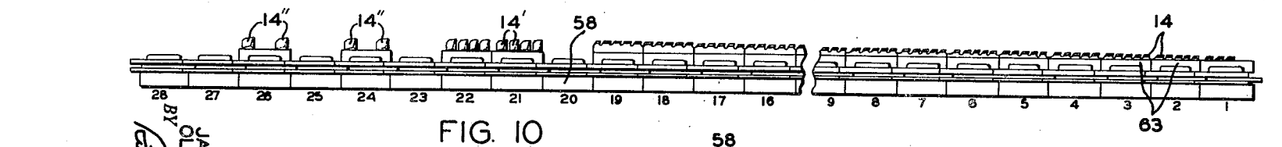
Figure 10 is a fragmentary view with the endless chain of blade carrying elements extended into a straight line to illustrate one arrangement of cutter blades contemplated by the invention.

The particular form of the cutting blades is not a part of the present invention, and, if desired, all of the blades may be either roughing blades or finishing blades; and these either may vary in height so as to progressively take deeper cuts in the blade as the chain revolves, or the blades may all be of the same height and the feed during cutting accomplished by slowly advancing the work G along axis 11 or along axis 15 (i. e. by movement of the work head along ways 17 or 24). However, it is preferred to make the blades of progressively greater height, as is shown in Figure 10, and to so arrange them as to complete the cutting of one tooth space, whether rough or finish cutting, in one revolution of the chain. In Figure 10 the segments 63 which are numbered 1 to 19 have roughing blades 14 which progressively increase in height, so that as the chain rotates they progressively cut deeper and deeper into the blank, with the chip load of the several blades being approximately equal. The link 58 numbered 20 contains no cutting blade, while the blades, designated 14', on links numbered 21 and 22 are semi-finishing blades. The blank link, number 20, enables the last roughing blade to clear the work before the first semi-finishing blade 14' enters the tooth space. For a similar reason the links numbered 23 and 25 are devoid of blades, and the finishing blades 14" which follow them are themselves widely spaced so that only one of them will be in the cut at one time. As shown the blades 14' and 14" are side cutting blades, which operate to form the tooth profile, whereas the roughing blades 14 are bottom cutting. Links 27 and 28 are blank to allow time for indexing of the work while the cutter chain continues to rotate; the space provided by these blank links provides a time interval, after the last finishing blade leaves the cut and before the first roughing blade is in position to enter the cut, during which the blank G may be rotated by suitable indexing mechanism (not shown) to bring a succeeding tooth space into position to be cut. In this way an entire gear may be cut without any stoppage of the cutter mechanism.

It will be apparent, of course, that various combinations of blades are possible, depending upon the pitch of the gears to be cut and the kind of finish desired. For example more or less blades 14' or 14'' may be provided, or either or both of them eliminated altogether, leaving the cutter with only roughing blades 14; or the entire chain can be made up of links containing semi-finishing and finishing blades together with any blank spaces which may be necessary.

It will be understood that the foregoing description and drawings of the machine and cutter have been made by way of illustration and example of the principles of the invention, and not by way of limitation, and that these principles may be embodied in various other forms without departing from the spirit of the invention or from the scope of the appended claims.

We claim:

1. In a machine for cutting spiral bevel gears and other parts having longitudinally curved teeth, the combination of work support means, a rotatable cutter core, an endless chain comprising pivoted links carrying cutter blades and arranged to run over the core, each of the links being shaped to seat upon the core in fixed relationship to the axis of the core for rotating as a unit with the core for a part of one revolution of the latter during each revolution of the chain, means to guide the chain to and from the cutter core, the cutter core and the guide means being so disposed relative to the work support means that the cutter blades engage the work only while their respective links are seated upon the cutter core and are rotating as a unit therewith, and the cutter blades projecting from their respective links in a direction substantially parallel to the axis of the cutter core so as to cut in the manner of face mill cutter blades.

2. In a machine for cutting spiral bevel gears and other parts having longitudinally curved teeth, the combination of work support means, a rotatable cutter core, a plurality of elements at least some of which carry cutter blades and each of which is shaped to seat upon the core in fixed relationship to the axis of the core for rotating as a unit with the core, means for guiding the elements in succession to and from the cutter core, the cutter core and the guiding means being so disposed relative to the work support means that the cutter blades engage the work only while their respective elements are seated upon the cutter core and are rotating as a unit therewith, and the cutter blades projecting from their respective elements in a direction substantially parallel to the axis of the cutter core so as to cut in the manner of face mill cutter blades.

3. In a gear cutting machine, the combination of work support means, a cutter support, a cutter core mounted for rotation on the cutter support, an endless chain comprising pivoted links arranged to run over the core, at least some of the links carrying cutter blades and each of the links being adapted to seat upon the core for rotating as a unit therewith for a part of one revolution of the cutter core during each complete revolution of the chain, means for guiding the chain to and from the cutter core, and means mounting said guiding means upon the cutter support for movement relative to the latter about the axis of the cutter core, whereby the guiding means may be so disposed relative to the work support means that the cutter blades will engage the work while their respective links are seated upon the cutter core and are rotating as a unit therewith.

4. In a gear cutting machine, the combination of work support means, a cutter support, a cutter core mounted for rotation on the cutter support, a plurality of elements at least some of which carry cutting blades and each of which is adapted to seat upon the core for rotating as a unit therewith, means for guiding said elements successively to and from the core, said guiding means being so arranged that during each revolution of the elements each of the latter will rotate with the core for a part only of one turn of the core, and means mounting the guiding means upon the cutter support for movement relative to the latter about the axis of the cutter core, whereby the guiding means may be so disposed relative to said cutter support that the cutting blades will engage the work while their respective elements are seated upon and are rotating with the core.

5. In a gear cutting machine, the combination of work support means, a cutter support, a cutter housing mounted on the cutter support, a rotatable cutter core within the housing, an endless chain comprising pivoted links for running over the core within the housing, at least some of said links carrying cutter blades and each of the links being adapted to seat upon the core for rotating as a unit therewith for a part of one revolution of the cutter core during each complete revolution of the chain, means carried by the housing for guiding the chain to and from the cutter core, and means supporting the cutter housing upon the cutter support for angular movement thereon about the axis of the cutter core, whereby the housing may be so positioned relative to the work that the cutter blades will engage the work while their respective links are seated upon the cutter core and are rotating as a unit therewith.

6. In a gear cutting machine, the combination of work support means, a cutter support, a cutter housing mounted on the cutter support, a rotatable cutter core, a plurality of elements at least some of which carry cutting blades and each of which is adapted to seat upon the core for rotating as a unit therewith, means supported by and within the cutter housing for guiding said elements in succession to and from the core, said guiding means being so arranged that during each revolution of the elements each of the latter will rotate with the core for a part only of one turn of the core, and means supporting the cutter housing upon the cutter support for angular movement thereon about the axis of the cutter core, whereby the cutter housing may be so positioned relative to the work that the cutting blades will engage the work while their respective elements are seated upon and are rotating as a unit with the core.

7. In a machine for cutting spiral bevel gears and other parts having longitudinally curved teeth, the combination of work support means, a rotatable cutter core, an endless chain comprising pivoted links carrying cutter blades, and arranged to run over the core, each of the links being shaped to seat upon the core in fixed relationship to the axis of the core for rotating as a unit with the core during a part of one revolution of the latter for each complete revolution of the chain, means for guiding the chain to and from the cutter core, the cutter core and the guiding means being so disposed relative to the work support means that the cutter blades engage the work only while their respective links are seated on the cutter core and are rotating as a unit therewith, the cutter blades projecting from their respective links in a direction substantially parallel to the axis of the cutter core so as to cut in the manner of face mill cutter blades, said blades being of progressively different form, so as to progressively cut a complete tooth space in the work during one complete revolution of the chain while the axis and plane of rotation the cutter core remain stationary relative to the work support means, and the last and first blades being spaced sufficiently to enable indexing of the work on the work support while the cutter core and chain continue to operate.

8. In a machine for cutting spiral bevel gears and other parts having longitudinally curved teeth, the combination of work support means, a rotatable cutter core, a plurality of elements at least some of which carry cutter blades and each of which is shaped to seat upon the core in fixed relationship to the axis of the core for rotating as a unit with the core for a part of one revolution of the latter during each complete revolution of the elements, means for guiding the elements to and from the cutter core, the cutter core and the guiding means being so disposed relative to the work support means that the cutter blades engage the work only while their respective elements are seated on the cutter core and are rotating as a unit therewith, the cutter blades projecting from their respective elements in a direction substantially parallel to the axis of the cutter core so as to cut in the manner of face mill cutter blades, said blades being of progressively different form, so as to progressively cut a complete tooth space in the work during one complete revolution of the elements while the axis and plane of rotation of the cutter core remain stationary relative to the work support means, and the last and first blades being spaced sufficiently to enable indexing of the work on the work support while the cutter core and the elements continue to operate.

9. In a cutter for spiral bevel gears and other parts having longitudinally curved teeth, a rotatable cutter core and chain guide means, an endless chain of pivoted links running over the core and the guide means, the surface of said core being substantially circular in transverse cross-section and the inner faces of the links being of a shape complementary to said surface whereby each link when running on the core may seat firmly thereon and rotate as a unit therewith, at least some of the links each having at least one cutting blade projecting therefrom in a direction at least generally parallel to the axis of the core, and each of the blades being shaped to cut, in the manner of a face mill cutter blade, while its link is so rotating as a unit with the core.

10. In a cutter, the combination of a substantially closed housing, a rotatable cutter core and chain guide means arranged within the housing, an endless chain of pivoted links arranged within the housing to run over said core and guide means, cutter blades and means for detachably securing them to at least some of the links, at least the cutting edges of the blades projecting beyond the confines of the housing, one wall of the housing having an endless slot therethrough for passing the blades, the links substantially closing the slot throughout the entire length thereof to prevent ingress of foreign matter into the housing, and the means for detachably securing the blades being accessible from outside the housing whereby blades may be removed and replaced without opening the housing.

11. In a cutter, the combination of a housing, a rotatable cutter core and chain guide means arranged within the housing, an endless chain of pivoted links arranged within the housing to run over the core and the chain guide means, and at least some of the links each having at least one cutting blade projecting beyond the confines of the housing in a direction generally axial with respect to the core axis, one wall of the housing having an endless slot therethrough for passing the cutting blades, and the links substantially closing the slot throughout the entire length thereof to prevent ingress of foreign matter into the housing.

12. In a cutter, the combination of a rotatable core, an endless train comprising elements carrying cutter blades and arranged to run over the core, the elements being adapted to seat upon the core for a part of a revolution of the latter during each complete circuit of the train and the blades being adapted to cut while the elements are thus seated on the core, and means for clamping the elements to the core for causing them to rotate as a unit therewith while they are seated thereon.

13. In a cutter, the combination of a support, a core rotatable relative to the support, an endless train comprising elements carrying cutter blades and arranged to run over the core, the elements being adapted to seat upon the core for a part of a revolution during each complete circuit of the train, rolling members engageable with the elements which are seated upon the core, and means carried by the support for exerting pressure on the rolling members for clamping the seated elements to the core for rotation as a unit therewith.

14. In a cutter, the combination of a support, a core rotatable relative to the support, an endless train comprising elements carrying cutter blades and arranged to run over the core, the elements being adapted to seat upon the core for a part of a revolution during each complete circuit of the train, an endless chain of rolling members carried by the support for rolling engagement with the elements which are seated upon the core, a block for backing the rolling members that are engaged with the last mentioned elements, and means carried by the support for pressing the block toward the core and thereby acting through the rolling members to clamp the seated elements to the core for rotation as a unit therewith.

15. In a cutter, the combination of a support, a core rotatable relative to the support, an endless train comprising elements carrying cutter blades and arranged to run over the core, the elements being adapted to seat upon the core for a part of a revolution during each complete circuit of the train and the blades being adapted to cut while the elements are thus seated on the core, and clamping means carried by the support for exerting pressure on whichever of the elements is seated on the core, for clamping such seated element to the core for rotation as a unit therewith.

16. In a cutter, the combination of a support, a core rotatable relative to the support, an endless train comprising elements carrying cutter blades and arranged to run over the core, the elements being adapted to seat upon the core for a part of a revolution thereof during each complete circuit of the train and the blades being adapted to cut while the elements are thus seated on the core, clamping means carried by the support for exerting pressure on whichever of the elements is seated upon the core, for clamping the elements when seated to the core for rotation as a unit therewith, and other means carried by the support for exerting an opposing pressure on the core.

17. In a cutter, the combination of a support, a core rotatable relative to the support, an endless train comprising elements carrying cutter blades and arranged to run over the core, the elements being adapted to seat upon the core for a part of a revolution of the latter during each complete circuit of the train and the blades being adapted to cut while the elements are thus seated on the core, clamping means carried by the support for exerting pressure on whichever of the elements is seated upon the core, for clamping the elements when seated to the core for rotation as a unit therewith, rolling means engaging the core in a region substantially diametrically opposed from that engaged by elements when seated, and means carried by the support for exerting pressure on the rolling means in a direction substantially opposed to that exerted by said clamping means.

18. In a cutter, the combination of a housing, a rotatable cutter core having a recess with axially spaced side walls and a bottom wall, a train comprising cutter blade carrying elements, guide means on the housing for guiding the elements in train to and from the core in such manner that each element will seat in the recess for a part of a revolution of the core during each complete circuit of the train, each element having side and bottom surfaces for seating respectively on the side walls and bottom wall of the recess, and said blade carrying elements having surfaces other than said side and bottom surfaces for engagement with said guide means.

19. In a cutter, the combination of a rotatable cutter core having a recess with axially spaced side walls and a bottom wall, a train comprising cutter blade carrying elements, guide means for guiding the elements in train to and from the core in such manner that each element will seat in the recess for a part of a revolution of the core during each complete circuit of the train, each element having side surfaces and a bottom surface for seating respectively on the side walls and bottom wall of the recess, and each element having a surface that is concentric with the core axis when the element is seated in the recess, means engageable with said concentric surface for exerting pressure on the element for holding the bottom surface seated on the bottom wall, and said side surfaces and walls being so related as to wedge the element in the recess as the bottom surface thereof is brought into abutment with the bottom wall.

20. A cutter blade carrying element for seating in a recess in a rotatable cutter core, which recess is tapered in the axial plane, said element having converging side surfaces for engaging in wedged relation between similarly converging side walls of the cutter core, a bottom surface for seating upon a bottom wall of the recess, and a surface for engagement with means for holding the element seated in the recess, the last mentioned surface being substantially concentric with the axis of the core when said bottom surface is seated.

21. A cutter blade carrying element for seating in a recess in a rotatable cutter core that is tapered in the axial plane, said element being similarly tapered in said plane and having a surface of revolution that is substantially concentric with the cutter core axis for engagement with means for holding the element seated in the recess.

22. A rotary cutter comprising, in combination, a rotatable cutter core, a plurality of cutter blade carrying elements each adapted to fit on the core, the number of elements being greater than the number which will fit on the core at one time, means for guiding said elements to and from the core in order that each element in its turn may rotate for a part of a revolution with the core, cutter blades carried by the elements and adapted to cut while their respective elements are rotating with the core, and means for clamping the blades upon the core while they are so rotating therewith.

23. In a machine for cutting spiral bevel gears and other parts having longitudinally curved teeth, the combination of work support means, a rotatable cutter core, an endless train comprising elements carrying cutter blades and arranged to run over the core, the elements being adapted to seat upon the core for a part of a revolution of the latter during each complete circuit of the train, means for clamping the elements to the core while they are seated thereon for causing them to rotate as a unit with the core, and the core and the clamping means being so disposed relative to the work support that the cutter blades engage the work while their respective elements are so seated upon and clamped to the core.

24. In a machine for cutting spiral bevel gears and other parts having longitudinally curved teeth, the combination of work support means, a cutter support and a rotatable cutter core mounted thereon, an endless train comprising elements carrying cutter blades and arranged to run over the core, the elements being adapted to seat upon the core for a part of a revolution of the latter during each complete circuit of the train, means for guiding the train to and from the core, means mounting the guiding means upon the cutter support for movement relative to the latter for so positioning the guiding means that the blades will act on the work while their respective elements are seated upon the core, and means for clamping the elements to the core while they are seated thereon, for causing them to rotate as a unit with the core while the blades act on the work.

25. In a machine for cutting spiral bevel gears and other parts having longitudinally curved teeth, the combination of work support means, a cutter support and a cutter core rotatable thereon, an endless chain comprising links carrying cutter blades and arranged to run over the core, the links being adapted to seat upon the core for a part of a revolution of the latter during each complete circuit of the chain, a member carried by the cutter support, guide means carried by said member for guiding the chain to and from the core, means carried by said member for exerting pressure upon the links while they are seated on the core for clamping them to the latter, and said member being mounted on the cutter support for movement thereon to so position the guide means relative to the work support means that the blades will act on the work while their respective links are seated upon and clamped to the core.

26. In a cutter for gears and other toothed parts, a rotatable cutter core and train guide means, an endless train of elements running over the core and the guide means, the surface of the core being substantially circular in transverse cross-section, said elements having inner faces of a shape complementary to said surface whereby each element when running on the core may seat firmly thereon and rotate as a unit therewith, said elements having outer faces that are co-axial with the core when the elements are seated thereon, and means engaging said outer faces for clamping said elements to the core for causing them to rotate as a unit with the core while they are seated thereon, and at least some of said elements each having at least one cutting blade projecting therefrom and shaped to cut as a milling cutter blade.

References Cited in the file of this patent

UNITED STATES PATENTS

| Number | Name | Date |
|---|---|---|
| 581,689 | Brown | May 4, 1897 |
| 619,490 | Lawrence | Feb. 14, 1899 |
| 1,016,664 | Bailey | Feb. 6, 1912 |
| 1,468,393 | Perkins et al. | Sept. 18, 1923 |
| 1,553,672 | Northall | Sept. 15, 1925 |
| 2,252,044 | Slayton | Aug. 12, 1941 |
| 2,372,826 | Grob | Apr. 3, 1945 |
| 2,418,199 | Simmons | Apr. 1, 1947 |
| 2,517,901 | Luckenbach | Aug. 8, 1950 |